G. E. WINSLOW.
TRANSMITTING INSTRUMENT.
APPLICATION FILED JULY 31, 1908.
911,354.
Patented Feb. 2, 1909.
2 SHEETS—SHEET 1.
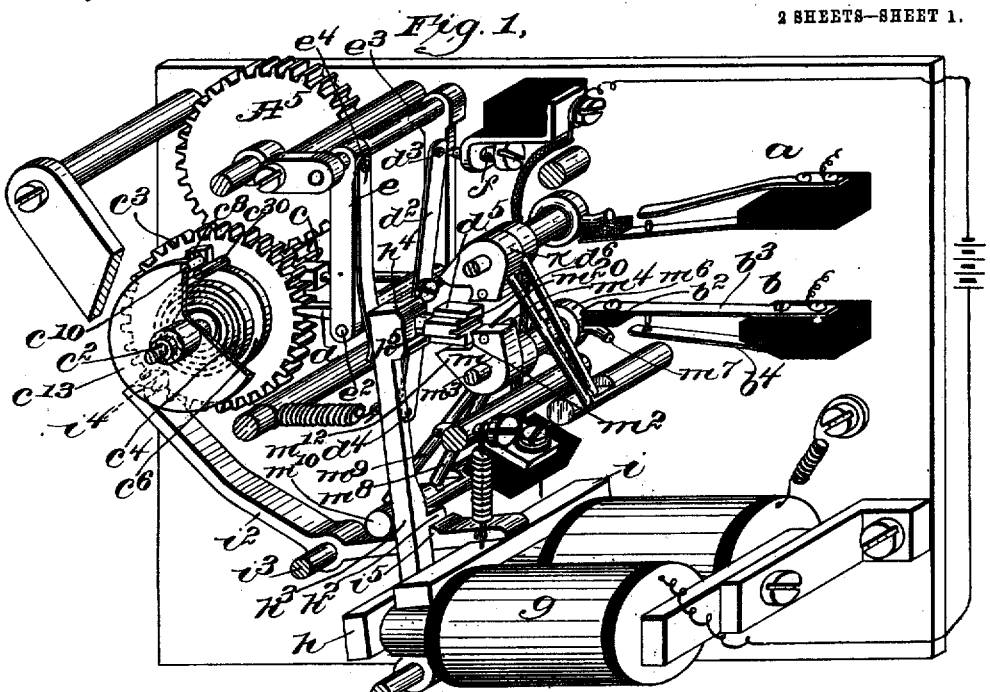
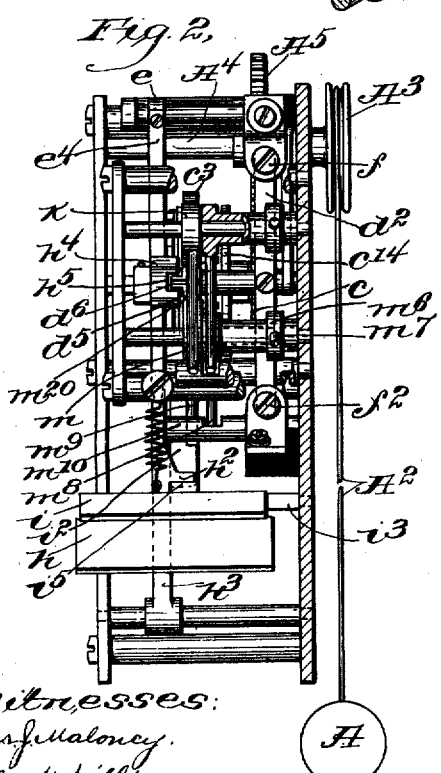
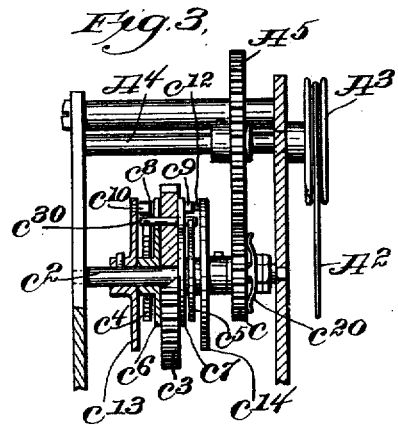
Witnesses:
Jas. J. Maloney.
G. H. Williams
Inventor:
George E. Winslow,
by J. P. and H. Livermore
Attys.

G. E. WINSLOW.
TRANSMITTING INSTRUMENT.
APPLICATION FILED JULY 31, 1908.
911,354.
Patented Feb. 2, 1909.
2 SHEETS—SHEET 2.
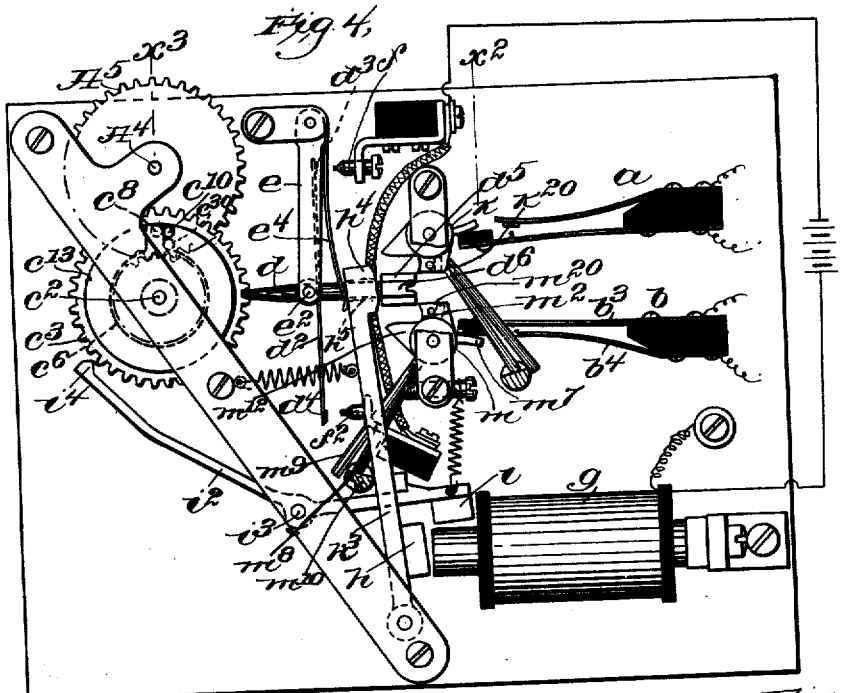
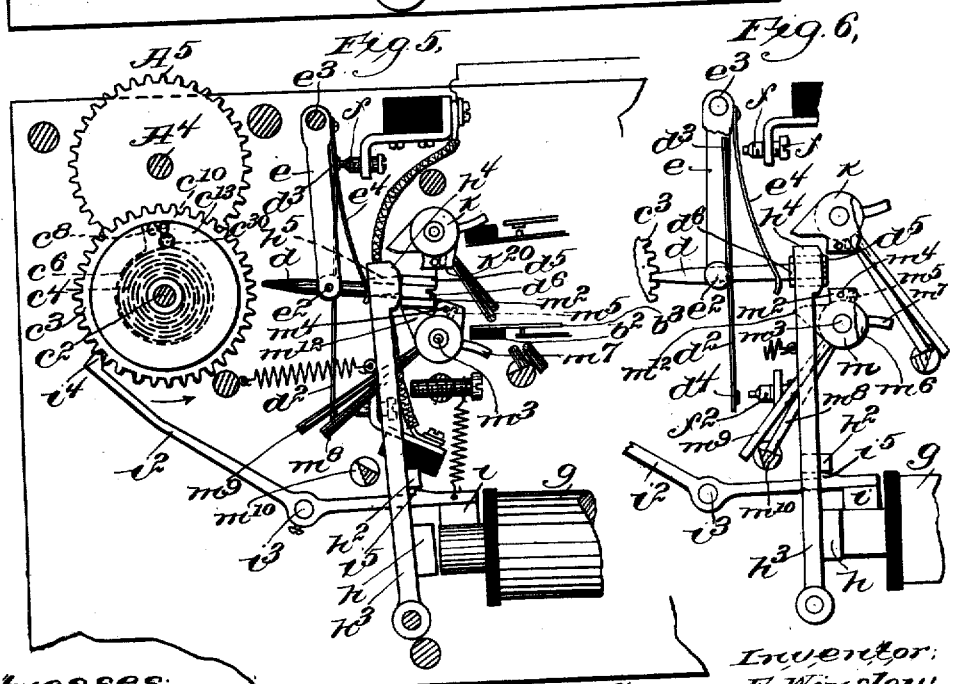
Witnesses:
Jas. J. Maloney.
G. H. Williams.
Inventor:
George E. Winslow,
by J. P. and H. P. Livermore
Attys.

UNITED STATES PATENT OFFICE.

GEORGE E. WINSLOW, OF WALTHAM, MASSACHUSETTS.

TRANSMITTING INSTRUMENT.

No. 911,354.　　Specification of Letters Patent.　　Patented Feb. 2, 1909.

Application filed July 31, 1908. Serial No. 446,280.

*To all whom it may concern:*

Be it known that I, GEORGE E. WINSLOW, a citizen of the United States, residing in Waltham, in the county of Middlesex and State of Massachusetts, have invented an Improvement in Transmitting Instruments, of which the following description, in connection with the accompanying drawings, is a specification, like letters on the drawings representing like parts.

The present invention relates to a transmitting instrument adapted for use in transmitting impulses of electric current to an indicating device located at a distance, the transmitter being mechanically operated in response to changes in condition which are to be recorded,—for example, changes in water level, pressure, or the like, which are susceptible of mechanically operating devices located in the proper place.

The purpose of the invention is to arrange the transmitting device so that a definite number of impulses of current corresponding exactly to the degree of change in either way, that is to say, the raising or lowering of water level, or the increase or decrease of pressure, or any change of condition which is susceptible of causing an actual movement of a moving part will be transmitted by electricity without any possibility of false impulses which might throw the apparatus out of synchronism and produce a false record at the recording instrument. To these ends, the apparatus is provided with a primary actuating device which is connected with some movable member operating in response to the changes of condition to be recorded, this member consisting of a toothed wheel which engages a pivoted lever so arranged that said lever will be rocked on its pivot one way or the other by a movement of the wheel in either direction, thereby closing an electric circuit through an electro magnet. The same rocking movement which closes the circuit causes the lever to engage selectively one or the other of a pair of circuit controllers, and the armature of the electro-magnet through which the circuit has been closed is arranged to move the lever endwise, to that whichever circuit controller is engaged thereby will be operated, the impulse of current controlled by one circuit controller being arranged to move the recording instrument in one direction, while impulses of current controlled by the other circuit controller are arranged to move the recording instrument in the opposite direction.

The electro-magnet is provided with two armatures, each of which constitutes a lock for the other, as will be hereinafter described, so that when the circuit is closed, one armature moves first, and thereby releases the other armature which then actuates the lever. The armature which moves first is provided with a locking device to engage the toothed wheel and hold the same in such a position that upon the return of the lever when the circuit has been broken, it will engage the following tooth without fail, so that the number of impulses will correspond exactly to the distance traveled by the said wheel. The armature which moves, after being released, as above described, and in its movement actuates the lever, in turn, locks the other armature, so as to insure the proper positioning of the lever in its return movement.

A further feature of the said invention consists in interposing a spring between said wheel and the member which is positively located by the changes in condition, so that after the change has taken place, the toothed wheel may be acted upon by the spring and caused to travel uniformly until it again engages the primary actuator member and comes to rest.

Figure 1 is a perspective view of an instrument embodying the invention; Fig. 2 is a transverse section, on line $x^2$ of Fig. 4; Fig. 3 is a sectional detail on the line $x^3$ of Fig. 4; Fig. 4 is a front elevation of the instrument; Fig. 5 is a view similar to Fig. 4 showing the parts in a different position; and Fig. 6 is a view similar to Fig. 5, showing the parts in a different position.

The instrument embodying the invention is provided with two circuit controllers *a* and *b* intended to control separate circuits leading to a recording instrument of any suitable nature located at a remote point, the closure of the circuit through the circuit controller *a* being adapted to cause an impulse which will move the recording instrument in one direction, while the closing of the circuit through the circuit controller *b* will cause an impulse to move the recording instrument in the opposite direction. Assuming, therefore, that these circuit controllers are arranged to be closed a certain definite number of times in response to a change in water level, a change in pressure, or a change in any other condition which can be originally caused to produce the displacement of a movable member, the action of the recording instrument will correspond and produce a true record of the variations in condition.

In order that the record may be absolutely accurate, the instrument embodying the invention is provided with interlocking mechanism which insures a definite number of closures of either circuit in response to a certain definite distance through which the main actuating member is moved by mechanical means. Assuming, for example, that the instrument is to be used to record changes in water level, the main actuating medium may consist of a float A, (Fig. 2) suitably connected as by a cord or belt $A^2$ with a pulley $A^3$ mounted on a countershaft $A^4$. This countershaft $A^4$ is shown as provided with a gear $A^5$ arranged to mesh with a gear $c$ on a shaft $c^2$ which also carries a gear or toothed wheel $c^3$ which constitutes what may be termed the primary actuating device of the transmitting instrument. In order to avoid any danger of breakage in case of an abnormal movement of the countershaft $A^4$, or its equivalent, the gear $c$ is loosely mounted on the shaft $c^2$, but frictionally held thereon by means of a spring $c^{20}$, Fig. 3, the stress of which is sufficient to connect the gear and shaft frictionally, so that they will turn together under normal conditions.

The purpose of utilizing the intermediate gear $A^5$ and the gear $c$ is merely to provide means for readily varying the proportionate movement between the primary actuator of the transmitter and the part which is positively moved in response to variations in condition, so that the instrument can be easily adapted for recording changes in condition which may be large or small. For example, if variations in pressure are to be recorded, the pulley $A^3$, or its equivalent, will be connected with a diaphragm, or its equivalent, the movement of which will be relatively small, thereby necessitating a large multiplication of the movement of the primary actuating device, in order to obtain the necessary record. On the other hand, if changes in water level were to be indicated, a direct connection might be equally well used, or, possibly, the movement of the primary actuating member geared down, instead of up. The primary actuating member $c^3$, consists, as previously stated, of a toothed wheel loosely mounted on the shaft and connected by a pin $c^{30}$ with a spring $c^4$, and a spring $c^5$ at opposite sides, and wound in opposite directions, the said springs being connected at their opposite ends with disks $c^6$ and $c^7$ which are also free to rotate on the shaft $c^2$. The said shaft $c^2$ has fixed thereon two disks $c^{13}$ and $c^{14}$ provided with stops $c^{10}$ and $c^{12}$ coöperating with stops $c^8$ and $c^9$ mounted on the disks $c^6$ and $c^7$. Any movement, therefore, of the shaft $A^4$ will be transmitted, through one pair of stops or the other, to one or the other of the disks $c^6$ or $c^7$, and then through the spring to the wheel $c^3$; and if the movement is sufficiently sudden or rapid to cause the stops to be separated and the spring put under tension, the toothed wheel $c^3$ will follow the stop under the influence of the spring until the stops again come together.

The pin $c^{30}$, to which the springs $c^4$ and $c^5$ are connected, projects through the wheel $c^3$ and forms a lateral abutment at each side, and each one of the loose disks has a portion ($c^{60}$, $c^{70}$) lying against this abutment against which it is drawn by the normal tension of the spring. It is through this engagement of the portions $c^{60}$ or $c^{70}$ with the pin $c^{30}$ that the spring, when under abnormal tension, carries the wheel $c^3$ until it is stopped by the stop on the fixed disk. Under normal conditions, however, that is, when there is a uniform, slow movement in either direction, the shaft $c^2$ and wheel $c^3$ will move together. It is immaterial, therefore, how rapid the change of condition may be, it being obvious that the toothed wheel $c^3$ will travel uniformly, actuating the circuit controller through the action of the successive teeth. For the purpose of actuating the circuit controller, the instrument is provided with a lever $d$, which is pivotally connected at $e^2$ with a swinging lever $e$ pivoted at $e^3$, so that the said lever $d$ is capable of an oscillating movement on the pivot $e^2$, as well as a longitudinal movement which takes place when the lever $e$ swings on its pivot. With the parts at rest, the lever $d$ stands in the neutral position indicated in Figs. 1 and 4, with its end resting between adjacent teeth of the wheel $c^3$. A movement of the wheel $c^3$ in either direction, therefore, will rock the lever $d$ in one direction or the other, the said lever $d$ being provided with a circuit closing spring, or member, $d^2$, having contact members $d^3$ and $d^4$ at opposite ends arranged to make contact with one or the other of stationary contact members $f$ or $f^2$, in accordance with the direction of rotation of the wheel. These contact members $f$ and $f^2$, together with the contact spring $d^2$, control a circuit through an electro-magnet $g$ which is provided with two interlocking armatures $h$ and $i$, the armature $i$ being arranged to constitute, when in normal position, a lock for the armature $h$, so that when the electro-magnet $g$ is energized, the armature $i$ must operate prior to the operation of the armature $h$. The armature $i$ is located at the end of a lever $i^2$ pivoted at $i^3$ and provided at the opposite end with a locking projection $i^4$ which is arranged to engage the teeth of the wheel $c^3$ upon the movement of the armature $i$ in response to the closure of the circuit. The function of the armature $i$, therefore, is to lock the wheel $c^3$ during the transmission of an impulse of current to the recording instrument, and this armature will be hereinafter referred to as the locking armature.

The lever $d$ is so arranged that a movement of the wheel $c^3$ substantially equivalent to the width of a tooth is necessary in order to rock the lever in either direction a sufficient distance to make contact and close the circuit through the magnet $g$. Upon such closure, the locking armature $i$ is attracted, thus bringing the locking member $i^4$ into engagement with the wheel $c^3$, and holding the said wheel in the position to which it has been moved in order to establish the circuit through the magnet $g$. The locking member consists of a V-shaped projection which is so located as to engage the wheel $c^3$ between two teeth, and in its engagement slightly moves the wheel so as to cause a slight further lateral movement of the lever $d$ to maintain the contact. The movement is such, moreover, as to cause a slight rub of the contact $d^3$ along the contact $f$, so that the engaging surfaces are kept clean and free from oxid. The attraction of the armature $i$, unlocks the armature $h$, by moving the retaining shoulder $i^5$ out of the path of a locking projection $h^2$ on a lever $h^3$ with which the armature $h$ is connected. This lever $h^3$ is provided at its upper end with an engaging portion $h^4$ which is arranged to come into contact with an enlargement $d^5$ at the end of the lever $d$, so as to move the said lever longitudinally, as indicated in Fig. 5. The function of the armature $h$ is to move the lever $h^3$ which directly operates the circuit controller for the recording instrument circuit, and this armature may, therefore, be termed the impelling armature. The movement of the wheel $c^3$ which has tipped the lever $d$ and established the circuit through the electro-magnet $g$ has also brought the engaging portion $d^5$ at the end of said lever into the path of one or the other of two rockers $k$ and $m$ which are arranged to cause the closure of the external circuits leading to the recording device.

As shown in Fig. 5, it may be assumed that the wheel $c^3$ has moved in the direction of the arrow, so as to rock the lever $d$ and establish a circuit through the contact $d^3$ and the contact $f$, thereby energizing the electro-magnet $g$. This same movement of the lever $d$ has brought the engaging portion $d^5$ into the path of a shoulder $m^2$ on the rocker $m$, so that the said rocker is moved on its pivotal support $m^3$. The rocker $m$ is provided with a pin or engaging member $m^4$ which is adapted to come into contact with a similar engaging member $m^5$ on a secondary rocker $m^6$ which has a tail or projection $m^7$ normally lying in contact with an insulating block $b^2$ at the end of a spring contact $b^3$, so as to keep the said contact out of engagement with a stationary contact member $b^4$ and hold the circuit leading to the recording device open. The member $m^6$ is further provided with a projection $m^8$ which constitutes a weight sufficient to overcome the stress of the spring $b^3$ when the parts are in the normal position shown in Figs. 1 and 4.

When the parts are in their normal position, the arm $m^8$, together with a corresponding arm $m^9$ on the member $m$, lie in contact with a stop $m^{10}$, and there is a slight lost motion between the engaging portions $m^4$ and $m^5$, so that a certain amount of impact will be produced, thus causing the projection $m^7$ to be thrown far enough to admit of the closure of the circuit through the agency of the spring contacts $b^3$ and $b^4$. The weighted arm $m^8$ on the member $m^6$ is arranged to engage an inclined or wedge-shaped surface on the stop $m^{10}$, so as to prevent it from rebounding and allowing a secondary closure of the circuit after the parts have been restored to their normal position.

The movement of the parts in response to the energizing of the electro-magnet $g$, brings the said parts primarily into the position shown in Fig. 5, with the rocker $m$ engaged by the end of the lever $d$ which, in turn, is in engagement with the lever $h^3$. The momentum of the parts, however, will cause the end of the lever $d$ to be acted upon by a projection $m^{12}$ which engages the under side of the rear end of the said lever $d$, throwing the same upward until a tongue $d^6$ formed upon said lever comes into alinement with a guide slot $h^5$ formed in the upper end of the lever $h^3$, thereby allowing the lever $d$, as shown in Fig. 6, to move back under the stress of a spring $e^4$ connected with the rocking lever $e$, and bearing against the upper end of the lever $h^3$. The tongue $d^6$ and guide $h^5$ coöperate in positioning the lever $d$ in the return movement thereof, so that the end of said lever will unfailingly engage the proper tooth on the wheel $c^3$, and the said wheel is arranged to be held stationary during the return movement of the lever $d$ by means of the locking device $i^4$ which has been previously described. In order that the said locking device may operate as above described to prevent any possible displacement of the wheel prior to its engagement by the lever $d$, the said locking device is arranged to be held in position or locked by the lever $h^3$ until the latter has returned to its normal position. To this end, the locking projection $h^2$ which primarily acts to prevent the armature $h$ from moving until after the armature $i$ has completed its movement, is so positioned as to ride over and engage the lever $i^2$ when both armatures are in their attracted position, (Fig. 6) so that the lever $h^3$ must return to its normal position before the wheel $c^3$ is released.

It is to be noted that the rocking of the lever $d$, by the tongue $m^{12}$, does not in itself break the primary circuit through the magnet $g$, since both ends of the spring $d^2$ will be brought into contact with the points $f$ and $f^2$, and the circuit will not be finally broken until the lever $d$ has made its lengthwise return movement and has nearly reached the wheel. The guide-slot $h^5$, therefore, does not move until it has performed its function in directing the lever $d$ to the right point on the wheel. Furthermore, the interlocking of the two armatures above described prevents the locking member $i^4$ from disengaging the wheel $c^3$ before the other members have acted.

The sequence of operations each time the primary actuating device is moved is as follows: Contact is made with one or the other of the terminals $f$ or $f^2$, and the electro-magnet $g$ is energized. Armature $i$ makes its full movement, locking the wheel $c^3$, before armature $h$ can move. Armature $h$ then moves, locking armature $i$, and producing a closure of the transmitting circuit. Lever $d$ is thrown into position to be restored under the guidance of lever $h^3$, and in being restored breaks the circuit through the electro-magnet. Both armatures are thus released, but the locking device cannot leave the wheel until all other movements are completed.

In order to prevent the lever $d$ from being thrown by the projection $m^{12}$ beyond the position in which the tongue $d^6$ is in alinement with the guide-slot $h^5$, each of the rockers $k$ and $m$ is provided with a guide surface $k^{20}$ and $m^{20}$ against one of which surfaces the enlargement $d^5$ will bring up. This is best indicated in Fig. 5, in which the member $m^{12}$ of the rocker $m$ is indicated as engaging the under side of said enlargement $d^5$. As the movement indicated in said Fig. 5 is completed, the enlargement $d^5$ will stop in contact with the guide surface $k^{20}$ of the rocker $k$, and thereby will be so positioned that the tongue $d^6$ will pass through the guide groove $h^5$. If the rocker $k$ is in operation, the guide surface $m^{20}$ performs the same function.

Claims.

1. In a transmitter, a movable actuating device; a circuit controller actuated thereby; an electro-magnet in circuit with said controller; a locking armature and an impelling armature both in the field of said electro-magnet; a locking device for said actuating device connected with said locking armature; a circuit to control a recording instrument; a circuit controller for said circuit; an actuating device for said circuit controller operated by the impelling armature; and means whereby said impelling armature acts as a lock for the locking armature.

2. In a transmitting device, the combination with two circuit controllers; of an actuator for each controller; a pivotally supported lever located adjacent to said actuators; means for rocking said lever into the path of one or the other of said actuators; an electro-magnet; a circuit controller for said electro-magnet operated by the rocking movement of said lever; and an impelling device for said lever operated in response to the energizing of said electro-magnet.

3. In a transmitting device the combination with a circuit controller; of a pivotally supported weighted member adapted to hold said circuit controller in position to open the circuit; a supplemental weighted member provided with an engaging portion to engage the first weighted member, there normally being lost motion between said weighted members; and an impelling device adapted to actuate said second weighted member, substantially as and for the purpose described.

4. In a transmitting device, the combination with a rotary actuating member; of a toothed wheel loosely mounted thereon; stop members loosely mounted on said rotary actuating member at opposite sides of said wheel; stops connected with the rotary actuating member at opposite sides of said toothed wheel and adapted to engage the stops on said stop-members in opposite directions; oppositely wound springs connecting said stop members with said toothed wheel; and circuit controllers operated by the rotation of said toothed wheel in either direction.

5. In a transmitting instrument, the combination with a rotary member adapted to be moved in either direction by mechanical means; of an electro-magnet; a circuit closer to complete the circuit through said electro-magnet, and operated by the movement of said wheel in either direction; means for locking said wheel stationary in response to the energization of said electro-magnet; a circuit controller to control a circuit leading to a distant point; and an impelling device also operated by the energization of said electro-magnet for operating said circuit controller, substantially as described.

6. In a transmitting instrument, the combination with a rotary wheel provided with peripheral teeth or engaging portions of a pivotally supported lever normally in engagement with said wheel; an electro-magnet; a circuit controller for said electro-magnet connected with said pivotally supported lever and arranged to close the circuit when said lever is rocked on its pivot by a rotary movement of said wheel; an impelling lever having an armature in the field of said electro-magnet adapted to engage said lever first named and move the same longitudinally, said impelling lever being provided with a guide; means for rocking said pivotally supported lever upon its pivot after the longitudinal movement thereof has been completed; a restoring spring to move said pivotally supported lever in the opposite direction in which movement it is guided by the guide aforesaid; a locking device for the rotary wheel; an armature for said locking device whereby it is operated when the electro-magnet is energized; and interlocking devices between said impelling lever and said locking device, whereby the locking device is operated prior to the operation of the impelling lever and released after the operation of the impelling lever has been completed.

7. The combination with a pivotally supported lever and means for rocking the same on its pivot; of an electro-magnet; means for closing a circuit through said electro-magnet in response to the rocking movement of said lever; an impelling device operated in response to the energization of said electro-magnet, said impelling device being adapted to produce a longitudinal movement of said lever; two actuators for circuit controllers each having a portion adapted to be engaged by said lever and a portion to engage said lever in the resulting movement and a guide portion to position the lever; and a guide forming part of the impelling device with relation to which guide the lever is positioned in its return movement by means of said actuators.

8. In a transmitting instrument, a circuit-controller; a traveling actuating member adapted to produce operations of said circuit controller the number of which depends on the distance traveled; a primary actuating member; and a spring connection between said actuating member and said primary actuator, whereby said parts may be moved an equal distance at different speeds.

9. In a transmitting instrument a ciricuit controller; a wheel adapted to actuate said circuit controller; a shaft on which said wheel is loosely mounted; a disk also loosely mounted on the shaft adjacent to said wheel; a spring connected at one end to said wheel and at the other end to said disk; engaging portions on said disk and wheel respectively which are normally held together by said spring; a stop on the disk; and a coöperating stop fixed with relation to the shaft, whereby the loose disk is positively operated by the shaft and the movement of said loose disk transmitted through the spring to the wheel.

In testimony whereof, I have signed my name to this specification in the presence of two subscribing witnesses.

GEORGE E. WINSLOW.

Witnesses:
JAMES J. MALONEY,
W. E. COVENEY.